March 4, 1952  C. E. SMITH  2,588,054
FILM WINDING CONTROL FOR CAMERAS
Filed July 25, 1949  5 Sheets-Sheet 1
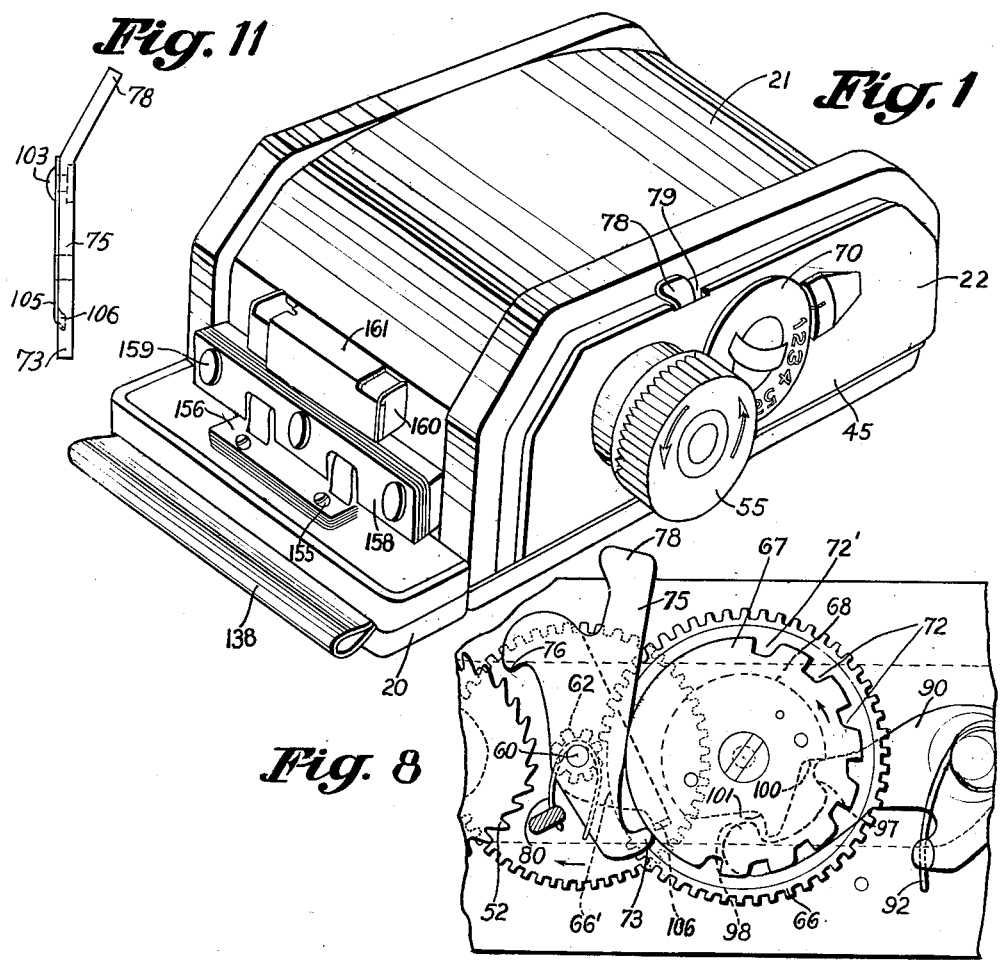
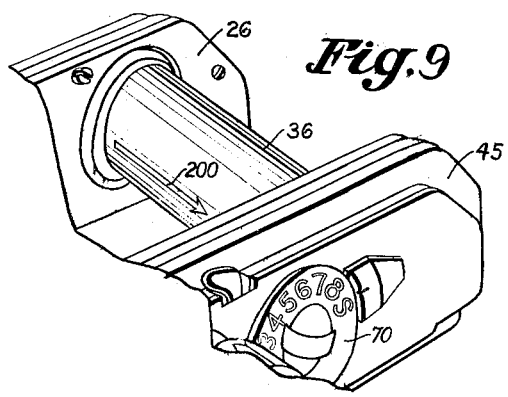
INVENTOR.
CLARENCE E. SMITH
BY
ATTORNEY March 4, 1952 C. E. SMITH 2,588,054
FILM WINDING CONTROL FOR CAMERAS
Filed July 25, 1949 5 Sheets-Sheet 2

INVENTOR.
CLARENCE E. SMITH
BY
ATTORNEY

March 4, 1952  C. E. SMITH  2,588,054
FILM WINDING CONTROL FOR CAMERAS
Filed July 25, 1949  5 Sheets-Sheet 3

INVENTOR.
CLARENCE E. SMITH
BY
ATTORNEY

March 4, 1952 C. E. SMITH 2,588,054
FILM WINDING CONTROL FOR CAMERAS
Filed July 25, 1949 5 Sheets-Sheet 4
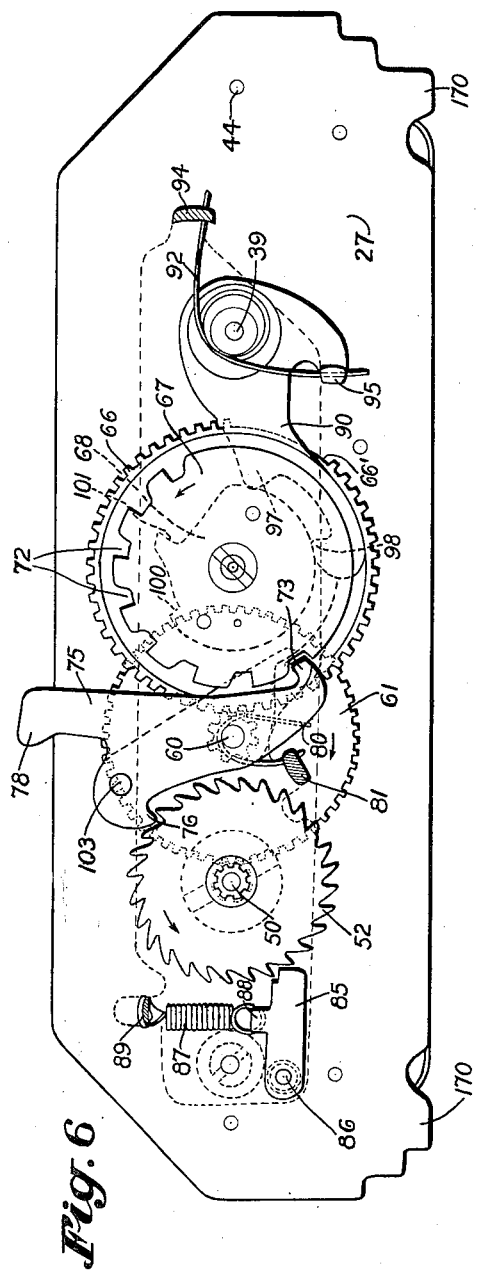
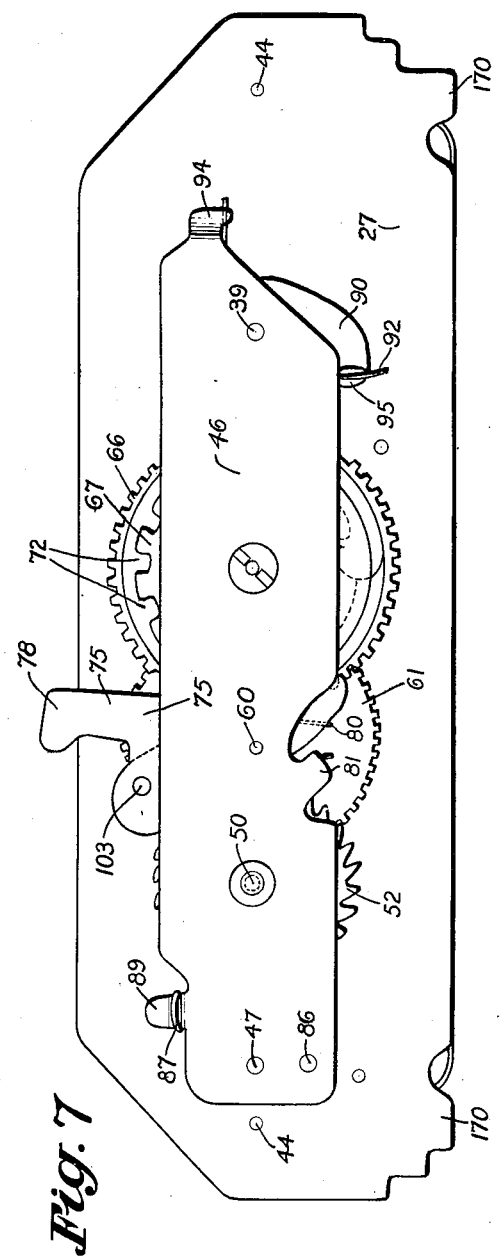
INVENTOR.
CLARENCE E. SMITH
BY
ATTORNEY March 4, 1952
C. E. SMITH
2,588,054
FILM WINDING CONTROL FOR CAMERAS
Filed July 25, 1949
5 Sheets-Sheet 5
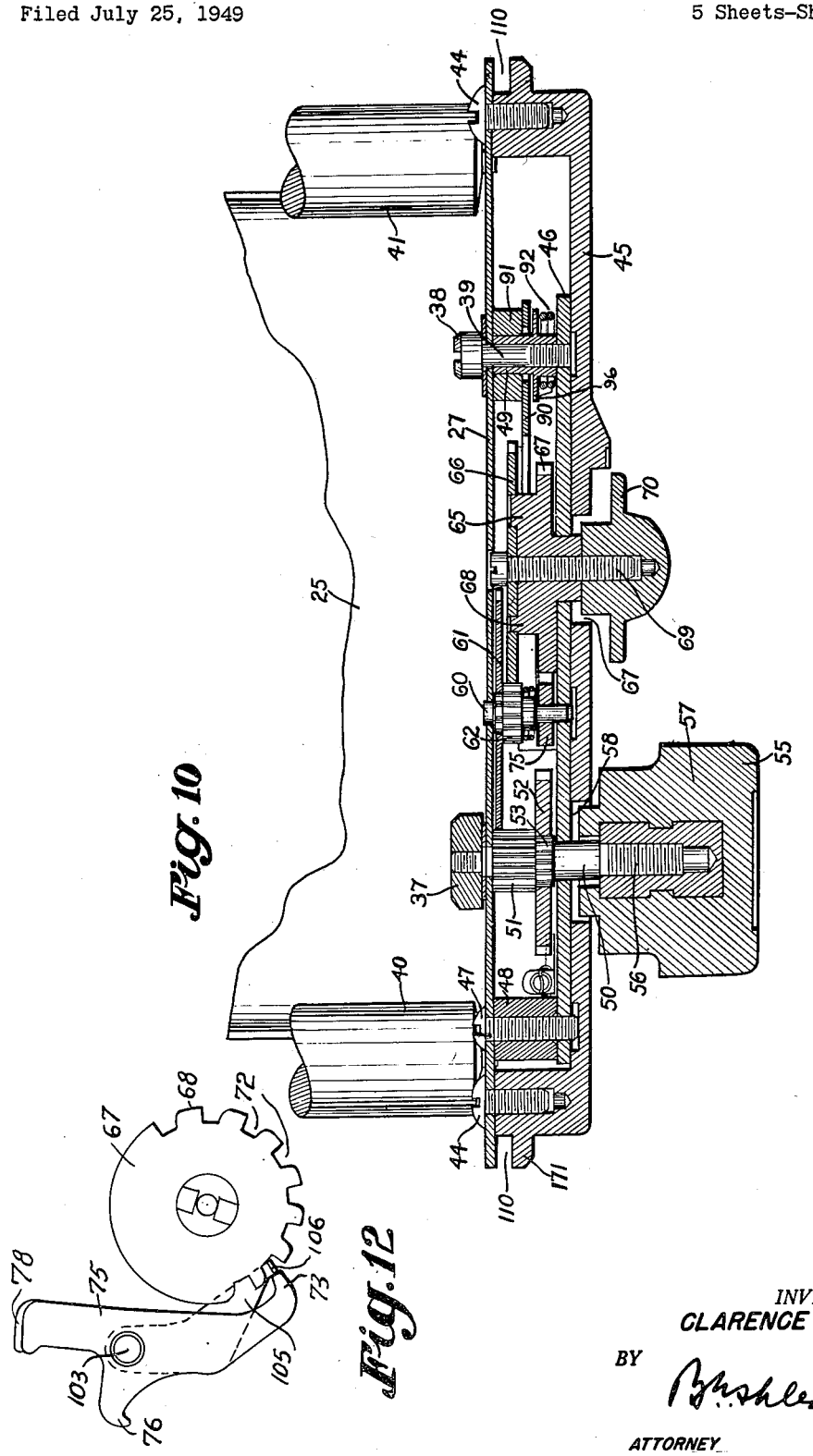
INVENTOR.
CLARENCE E. SMITH
BY
ATTORNEY Patented Mar. 4, 1952

2,588,054

UNITED STATES PATENT OFFICE 2,588,054

FILM WINDING CONTROL FOR CAMERAS

Clarence Elwood Smith, Rochester, N. Y., assignor to Graflex, Inc., Rochester, N. Y., a corporation of Delaware Application July 25, 1949, Serial No. 106,628

3 Claims. (Cl. 242—71)

The present invention relates to a film holder for use on photographic cameras. More particularly, the invention relates to a removable film holder that can be attached to a conventional type of camera having a suitable back plate that is equipped with a removable focusing panel.

There has long been a need for a suitable roll film holder for cameras of the type normally using film or plate holders; and, while there has been a number of roll film holders placed on the market at different times, all, insofar as I know, have been unsatisfactory in one way or another.

A primary object of this invention is to provide a roll film holder which is in the form of a wholly light-tight package that may readily be attached to or removed from a camera and that when it is in operating position will hold the film in flat condition at the focal plane of the camera.

A further object of the invention is to provide a roll film holder having a film spool carriage for carrying both the supply and take-up spools, which itself may be removed from the film holder, thus providing an easy means of loading film into the roll film holder.

Still another object of the invention is to provide a roll film holder having a removable film carriage, and permitting film to be partially unwound from the supply spool to the take-up spool before the carriage is replaced in the holder, and permitting the film to be further unwound after the carriage is in the holder to bring successive film areas into position for successive exposures.

A still further object of the invention is to provide a roll film holder having a simple indexing means that will automatically stop the winding knob when the film area for the first picture is in position and will automatically stop the film for each exposure thereafter until all of the exposures of the film have been made.

Still another object of the invention is to provide a roll film holder with a counting means in which the counter is automatically disconnected after all the exposures on the roll have been made, thus allowing the film trailer to be readily wound onto the take-up spool to render the take-up spool light-tight for removal from the roll film holder.

Other objects of the invention are to provide a removable roll film holder which is simple in construction, convenient to use, and that is easy to load and unload without scratching or otherwise marking the film surface.

Still other objects of the invention will be apparent hereinafter from the specification and from the recital of the appended claims.

In the drawings:

Fig. 1 is an isometric view of a roll film holder constructed according to one embodiment of the invention and showing the holder in closed condition with its counter in position for the first exposure;

Fig. 6 is a side view of the film spool carriage with the mechanism cover, the winding knob, counter dial, and the outer support plate removed to show the arrangement of the parts that make up the mechanism assembly; the parts being shown in position for the No. 1 exposure;

Fig. 7 is a similar view but with the outer support plate in position;

Fig. 8 is a fragmentary view similar to Fig. 6 but showing the counting mechanism at the starting position;

Fig. 9 is a fragmentary isometric view of the film spool carriage, similar to the view of Fig. 3, but showing the film supply spool in the starting position;

Fig. 10 is a fragmentary sectional view on an enlarged scale taken on the line 10—10 of Fig. 5;

Fig. 11 is a detail view showing the counter release lever assembly in side elevation; and Fig. 12 is a detail view showing the lock lever disengaged from the index plate and the spring lever in engagement with a notch of the plate.

Figure 2:
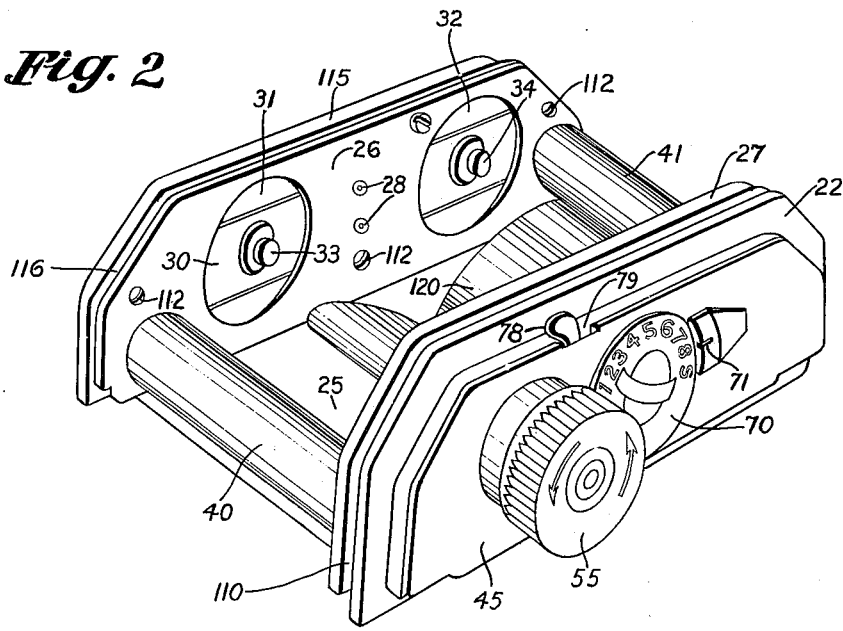
Fig. 2 is an isometric view of the film spool carriage removed from the roll film holder, the film spools having been removed from the carriage, and the counter being shown in the position it occupies when the eighth exposure has been made.

Referring now to the drawings by numerals of reference, 20 denotes generally the roll holder base; 21 is the roll holder cover; and 22 is the film spool carriage. The carriage 22 is adapted to be removably secured between the cover 21 and the base 20, the cover being hinged to the base to permit the carriage to be removed from or to be replaced upon the base.

The film spool carriage is in the form of a U-shaped frame having a bottom member 25

Figure 4:
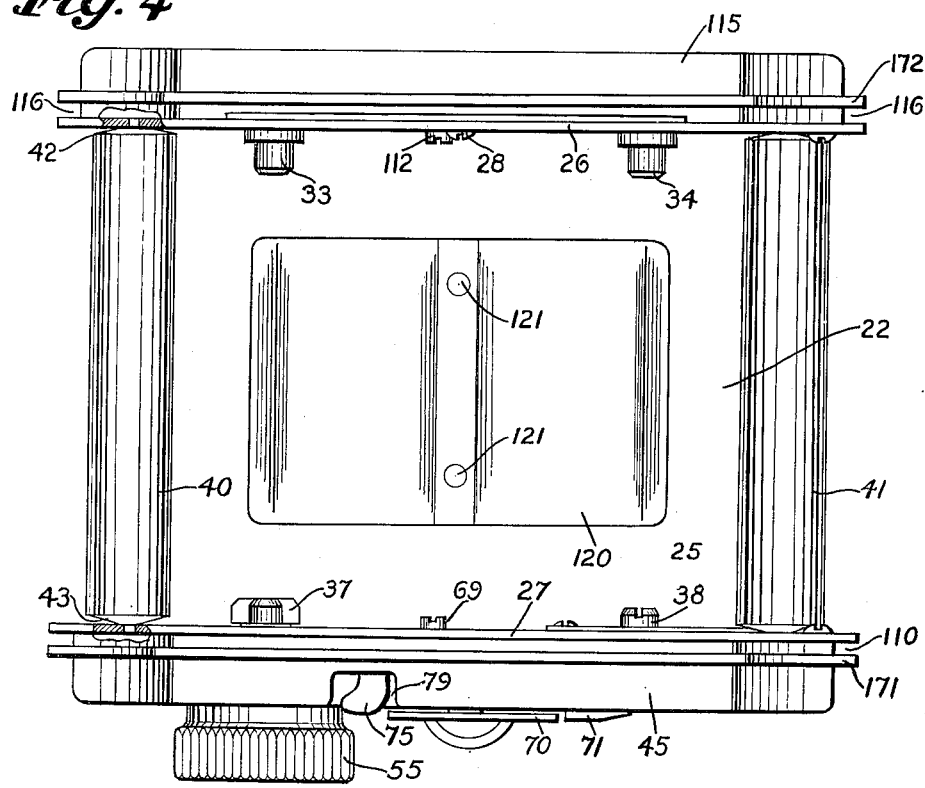
Fig. 4 is a top plan view of the film spool carriage with the film spools removed.

(Fig. 4) and upstanding side walls 26 and 27 (Figs. 2 and 4). The bottom member 25 forms a film pressure pad to hold the film in the focal plane of the camera after the carriage is assembled in the roll holder and the roll holder has been attached to the camera.

Secured to the side wall 26 by rivets 28 is a leaf spring 30 (Fig. 2). The side wall 26 is provided with two spaced circular openings 31 and 32. Mounted upon the spring 30 at opposite sides of the rivets 28 and in alinement with the openings 31 and 32 are the shoulder studs 33 and 34. Stud 33 forms a bearing for one end of the take-up spool 35 (Fig. 3) of the film holder, and stud 34 forms a bearing for one end of the supply spool 36. The opposite end of the take-up spool is adapted to be connected to and supported by the spool drive member 37 (Figs. 4 and 10), to which further reference will be made hereinafter, and the opposite end of the supply spool is adapted to be carried by the bearing end 38 of a screw 39.

Between the two side walls 26 and 27 are mounted the idler rolls 40 and 41. The idler roll 40 is provided at opposite ends with stub shafts or trunnions 42 and 43 (Fig. 4) that fit into suitable journal holes in the walls 26 and 27, respectively, to rotatably support the roll on the carriage. Roller 41 is similarly mounted in the walls 26 and 27.

Attached to the wall 27 of the carriage by machine screws 44 (Fig. 10) is a cover plate 45. Between the wall 27 and the cover plate 45 there is mounted a flat supporting plate 46. This is secured in spaced relation to the side wall 27 by means of screws 47 and 39 and bushings 48 and 49. The bushings 48 and 49 surround the screws 47 and 39, respectively, and are interposed between side wall 27 and supporting plate 46.

Journalled in aligned holes in the wall 27 and plate 46 is a shaft 50. This shaft is threaded at its inner ends; and to this threaded inner end is secured the drive key 37, previously referred to, for the take-up film roll. The shaft 50 has a wide-faced spur pinion 51 integral with it, and it has a splined portion 53 upon which is mounted a ratchet wheel 52. The shaft 50 is adapted to be rotated manually by a knob 55. The shaft has a threaded outer end 56 which threads into the bushing 57 of the knob 55. The cover plate 45 has a recess or aperture 58 formed in it to receive the knob.

Mounted in the aligned holes in the wall 27 and supporting plate 46 in parallelism to shaft 50 is a short shaft 60. The shaft 60 has a gear 61 splined to it and a pinion 62 integral with it. The gear 61 meshes with the pinion 51 of shaft 50, so that the shaft 60 is rotated on rotation of the knob 55.

Journalled in the supporting plate 46 is a hub member 65 to which there is secured an interrupted spur gear 66 having a portion 66' around its periphery which is without teeth. This gear is adapted to mesh with the pinion 62 of shaft 60. Integral with the hub member 65 is a notched index plate 67 (Figs. 6, 8 and 10). Also integral with the hub member 65 is a cam 68. Secured to the hub member 65 by means of the screw 69 is the counter dial 70 (Figs. 1 and 10). This dial is held against rotation relative to the hub member 65 by a key (not shown). Cover plate 45 has a hole or recess 67 in it to receive the dial.

The counter-dial 70 is graduated, as shown, in accordance with the number of pictures that may be made from a roll of film. This dial is adapted to read against an index mark (Figs. 2, 3 and 5) provided on a lug 71 which is integral with the cover plate 45.

The index plate 67 is provided with a plurality of notches 72 which are spaced unequal distances apart (Figs. 6, 8 and 12). The first notch is denoted at 72'. These notches correspond in number to the number of exposures on the film which is to be used in the camera. They are adapted to be engaged successively by the hooked end 73 of a lever 75 that is pivotally mounted on the shaft 60 (Figs. 8 and 10). The lever 75 is provided with another hook-like portion 76 at the end opposite hook 73; and this hook-like portion 76 is adapted to engage the teeth of the ratchet wheel 52. The lever 75 is also formed with a projecting end 78 which extends upwardly through a notch 79 (Fig. 2) in the cover plate 45 (Fig. 1). By pressing on projecting end 78 to swing the lever in a clockwise direction about the axis of shaft 60, as viewed in Fig. 6, the lever may be disengaged from the notches of index plate 57 and ratchet wheel 52 as will further be described hereinafter.

In the embodiment of the invention shown in the drawings, the index plate 67 is notched only around approximately half of its periphery and the remaining approximate half of the periphery of the plate is smooth. The hooked end 73 of the lever 75, which constitutes a dog, is constantly urged into engagement with the index plate and the hooked end 76 of this lever is constantly urged into engagement with the ratchet wheel 52 by a coil spring 80 which is coaxial with shaft 60. One end of this spring is hooked around the lower end of the lever 75 (Figs. 6, 7 and 8) and its opposite end is hooked over a projection or lug 81 formed on plate 46.

The lock-lever 75 not only holds the ratchet wheel 52 and, through it, the film take-up spool 35 (Fig. 3) in any position to which it has been rotated but prevents accidental movement of the knob 55 in a counter-clockwise direction while any of the exposable part of the film is in position to be exposed. To prevent clockwise rotation of the knob 75 a stop-dog 85 (Fig. 6) is provided. This stop-dog is pivoted on the plate 27 on a shoulder rivet 86. It is held in engagement with the ratchet wheel by a coil spring 87, which is hooked at one end over a lug 88 provided on the stop-dog and which is hooked at its opposite end over a lug 89 provided on the plate 27.

Attached to the lever 75 by means of a rivet 103 (Fig. 11 and 12) is a flat spring or arm 105. This spring or arm has a finger 106 bent laterally from it (Figs. 8, 11 and 12) that is adapted to engage the notches 72 of the index plate 67 when the lever 75 is rotated in a counter-clockwise direction, as will be described further hereinafter, to hold the lever out of engagement with the notches of the index plate.

Secured in any suitable manner to the hub 91 (Fig. 10), which is rotatable on bushing 49, is a lever 90 (Figs. 6 and 10). The lever 90 is constantly urged into engagement with the periphery of the cam 68 by a coil spring 92. One end of this spring is hooked over a lug 94 formed on plate 27 (Figs. 6 and 7), and its opposite end is anchored in a lug 95 formed on the lever. The spring surrounds the bushing 49 between the plate 46 and a collar 96 that is formed integral with the bushing.

The lever 90 is provided with spaced fingers or engaging portions 97 and 98. Cam member 68 is provided with peripheral notches 100 and 101.

The fingers 97 and 98 of the lever 90 ride on the periphery of the cam plate 68 when the plate is in the position shown in Fig. 6, but are adapted to engage the shoulders formed by the notches 100 and 101, respectively, as seen in Fig. 8, when the cam plate is rotated from the position shown in Fig. 6 to that of Fig. 8. In this latter position hook 98 holds cam plate 68 and gear 66 against rotation in a clockwise direction, while spring 92 acting through finger 97 urges the cam and gear in a counter-clockwise direction.

The cover plate 45 is provided with a step adjacent supporting plate 27 which with the supporting plate forms a recess 110 which is adapted to cooperate with tongues formed in the base of the holder and in the cover of the holder, respectively, to form a light-tight fit between the film carriage, the base, and the cover.

Attached to the wall 26 of the carriage by screws 112 (Fig. 2) is a cover plate 115 (Fig. 4). The cover plate 115 serves to cover up the outside of the wall 26 and enclose the spring 30 (Fig. 2). The cover plate 115 is formed with a step adjacent the supporting plate 26; and this step forms with the supporting plate 26 a recess or groove 116 that is adapted to receive cooperating tongues on the base 20 and cover 21 to provide a light-tight fit between the film carriage, the base, and the cover.

To the bottom member or pressure pad 25 of the film spool carriage there is attached a leaf spring 120 (Figs. 2 and 4). This is fastened between its ends by means of rivets 121 to the bottom member 25. The spring member 120 is adapted to contact the peripheries of the two film spools 35 and 36 and provide a slight tension on these two spools.

When the film carriage is positioned upon the base, the grooves 110 and 116 (Fig. 6) of the carriage receive mating tongues formed on the base; and the ledges 171 and 172 (Figs. 4 and 10) around the cover plates 45 and 115 of the carriage seat in mating grooves of the base plate to form a light-tight fit with the base.

Feet or projections 170 (Figs. 6 and 7) are provided on the side plates 26 and 27 to support the film spool carriage on the base and to provide sufficient space for the free and easy passage of the strip of film. The pressure pad 25 at the same time holds the film in flat condition for exposure.

To a suitable boss formed on the base is fastened by means of rivets 155 the latch plate 156. This latch plate is adapted to coact with a latch member made up of a series of slides designated generally at 158 (Fig. 1), that are secured to the cover 21 by means of shoulder rivets 159. Certain of the plates, that make up sliding latch member 158, are connected to latch operating members 160 that are supported by a square tubular member 161. The cover latch forms no part of the invention and can be any suitable latch that will hold the cover 21 securely in place.

After the roll of film and the take-up roll have been mounted in the film spool carriage 22 and the cover 21 has been closed down over the carriage and locked to the base 20, the roll holder may be mounted upon the back of a conventional type camera having a suitable back. There is a groove in the base which is adapted to cooperate with a tongue on the rear of the camera to prevent light leaking in between the roll film holder and the camera.

Figure 3:
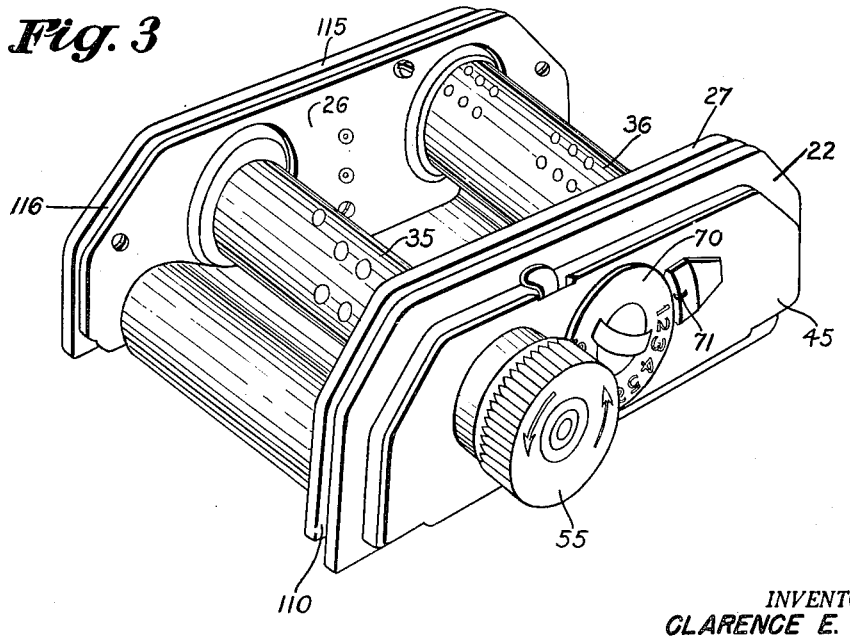
Fig. 3 is an isometric view similar to Fig. 2 but showing the film spools and film in place with the counter in position for the No. 1 exposure.

In use, to load the roll film holder, the film spool carriage 22 is removed from the base member 20 and a fresh roll of film 36 is mounted on and between the studs 34 and 38 (Figs. 3 and 4). The film is then threaded over and around the idler 41, under the pressure plate 25, around the idler 40, and into a take-up spool 35 that is positioned between the stud 33 and the drive key 37. The film is then wound on the take-up spool 35 (Fig. 3) by means of the winding knob 55 until the arrow 200 (Fig. 9), that appears on all rolls of film manufactured today, is in horizontal position as shown in Fig. 9. The film spool carriage 22 is then positioned on the base member 20 and the cover 21 closed over the carriage and latched in place by means of the latch members previously referred to.

Figure 5:
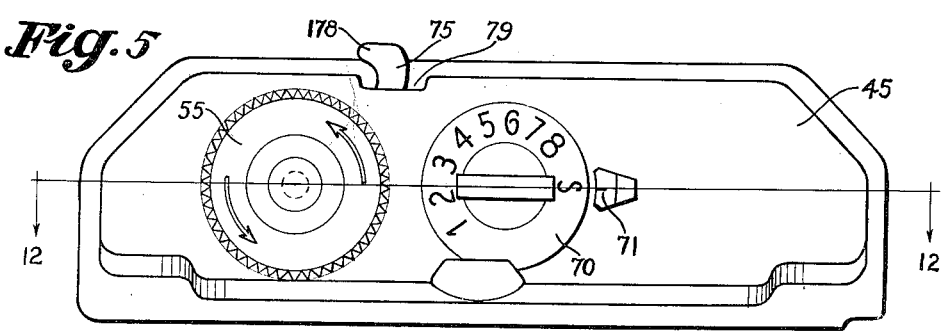
Fig. 5 is an end view of Fig. 4 showing the counter in position for the start of film winding.

The dial 70 is then adjusted to the position marked with the letter "S" (Fig. 5). The mechanism will then be in the position shown in Fig. 8 wherein the finger 97 of the dog 90 will be in contact with the side 100 of one notch of the cam 68. This will tend to cause the index plate 67 and gear 66 to turn in a counter-clockwise direction, as viewed in Fig. 8, bringing a toothed part of the gear 66 into engagement with the pinion 62.

At this time the hook portion 73 of the release lever 75 will be riding upon the periphery of the index plate 67 and the hook portion 76 of this lever will be held out of engagement with the ratchet wheel 52. The winding knob 55 can, therefore, at this time be turned freely. The film is thereupon wound on the take-up spool 35 (Fig. 3) until the first notch 72' (Fig. 10) of the index plate 67 comes into registry with the hook portion 73 of lever 75. Then the hook portion 73 will be snapped into engagement with the notch 72' by action of the spring 80. This will cause the hook portion 76 of the lever to engage the ratchet wheel 52 to prevent further rotation of the knob 55. The film will now be in position for No. 1 exposure and the counter dial 70 will be in the position shown in Fig. 3. In winding the film to the No. 1 position, the film leader is wound up on the take-up spool 35. Sufficient space has been provided on the index plate 67 to allow for the rather long length of the leader to be wound on the take-up spool before the first notch 72' reaches the finger 73.

After the first picture has been taken, the photographer presses the projecting portion 78 of the lever 75 to disengage the hook portion 73 from the notch 72'. The upturned finger 106 (Figs. 8, 11 and 12) of leaf spring 105 will at this time drop into the notch 72' of the index plate to hold the hooked end 73 of the lever 75 clear of the notch 72' so that the knob 55 can be turned. Fig. 12 shows the lock lever 75 in disengaged position and the finger 106 of the spring lever 105 engaged with one of the notches 72 of the index plate 67. As the interrupted gear 66 is turned in a counter-clockwise direction during winding of the film the spring finger 106 will ride up on the side of the notch 72' thus leaving the lever 75 and finger 73 free to drop into the next notch of the index plate once the plate has been turned sufficiently far. When this happens the rotation of the knob 55 will again be stopped; and the film will be in position for the second exposure. After the second picture has been taken, the lever 75 is released as before by pressing upon the protrusion 78.

So the operation proceeds. The notches 72 are spaced progressively decreasing distances apart, considered in a counter-clockwise direction around the index plate 67 so that the right amount of film will be fed onto the take-up spool after each exposure. When the eighth exposure has been reached, the non-toothed portion 66' (Fig. 8) of the gear 66 will be in registry with the pinion 62 and the gear 66 will no longer be turned when the knob 55 is rotated.

After the eighth exposure is made, the lever 75 is again released by pressing on the protrusion 78 and the finger 76 will be disengaged from the ratchet wheel 52 and held out of engagement with the ratchet wheel by action of the spring 105 (Figs. 8 and 11). The film trailer can be now wound on the take-up spool 35 (Fig. 3) but the film counter will remain at position 8 as shown in Fig. 4 because pinion 62 will be in registry with the untoothed portion 66' of gear 66 and will no longer transmit rotation to that gear. This condition will prevail until a new roll of film has been placed in the holder and wound to the position shown in Fig. 9, and the counter dial itself has been rotated to the position shown in Fig. 5 where the letter "S" of the dial 70 registers with the zero mark. The index plate 67, cam 68 and interrupted gear 66 are stationary during feed of the film to the position shown in Fig. 9 because the untoothed portion of gear 66 was left in registry with drive pinion 62 upon completion of the last (eighth) exposure of the preceding roll of film, and rotation of knob 55 is, therefore, not transmitted at this stage to gear 66. When the dial 70 is rotated to the starting position "S," however, the index plate 67, cam 68, and interrupted gear 66 are rotated with it. This again positions the mechanism in the position shown in Fig. 8, in which the toothed portion of gear 66 is in position to mesh with pinion 62 and the spring 92 acts through lever 90 and nose 97 of that lever to drive the cam 68 far enough in a counter-clockwise direction to cause the teeth of the gear to engage with the teeth of the pinion. The hook portion 98 of the lever 90 will hold the counter dial in that position against retrograde movement until the film is wound further. The knob 55 may then be rotated to advance the film to bring the first exposure area into exposure position and to rotate index plate 67 to the position shown in Fig. 6 where it is locked up with the film in this position.

As will be seen from the preceding description a roll film holder has been disclosed that is simple to manufacture and simple to operate. Loading of the holder can easily be effected; after the counter is once set, the film is automatically spaced for each exposure subsequent to the first; and the winding knob is stopped in a proper spaced position after each movement thereof until the release lever is operated.

While a film holder has been described which is constructed to make eight exposures, it will be obvious that with simple modification a different number of exposures can be provided. Thus, if the film is adapted to take twelve pictures, twelve exposures can be made simply by using an index plate 67 having twelve notches 72 properly spaced instead of the eight shown.

It will further be understood that while the invention has been described in connection with a specific embodiment thereof, it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A photographic film holder comprising a carriage, two supporting members rotatably mounted on the carriage for supporting a film supply spool and a take-up spool, respectively, manually operable means for rotating the take-up spool supporting member, an index plate rotatably mounted on the carriage, a train of gearing, including a drive pinion and an interrupted gear meshing therewith, for rotating the index plate upon rotation of said manually operable means, said index plate being provided with a plurality of notches extending part-way only around its periphery, a locking member movably mounted on the carriage and adapted to engage in the notches of the plate to lock the plate against rotation, a spring for constantly urging the locking member into locking position, said member being manually movable to disengaged position, said interrupted gear being so disposed angularly that its interrupted portion moves into registry with the drive pinion when the film has been wound far enough to bring the last exposure area into position for exposure, means for holding the locking member disengaged when it is moved out of locking position thereafter, a manually rotatable indicator dial connected to said index plate for rotating the index plate, when the locking member is disengaged therefrom, and spring-actuated means for urging the toothed part of the interrupted gear back into mesh with the drive pinion, when said locking member is disengaged and after said index plate has been rotated through a predetermined angle.

2. A photographic film holder comprising a carriage, two supporting members rotatably mounted on said carriage for supporting a film supply spool and a take-up spool, respectively, a notched index plate rotatably mounted on the carriage and having angularly spaced notches corresponding in number to the number of exposure areas of the film arranged part-way only around its periphery, manually operable means for rotating the member which supports the take-up spool, a ratchet wheel secured to the take-up spool supporting member, gearing, including a drive pinion and an interrupted gear meshing therewith, connecting said take-up spool support to the index plate, said interrupted gear being secured to the index plate with its untoothed portion in registry with the unnotched portion of the index plate, a double-armed lever pivotally mounted on the carriage and having a detent formed on one arm to engage the notches of the ratchet wheel and a detent formed on its other arm to engage in the notches of the index plate, said lever being manually rockable to disengage said detents, an arm secured to said lever whose free end is positioned to engage in the notches of the index plate upon disengagement of the last-named detent therefrom to hold the lever out of engaging position until the last-named detent enters another notch of the index plate, and a manually rotatable indicator dial connected to the interrupted gear and index plate for rotating the index plate and interrupted gear back to starting positions.

3. A photographic film holder comprising a carriage, two supporting members rotatably mounted on said carriage for supporting a film supply spool and a take-up spool, respectively, a notched index plate rotatably mounted on the carriage and having angularly spaced notches corresponding in number to the number of exposure areas of the film arranged part-way only around its perphery, manually operable means for rotating the member which supports the take-up spool, a ratchet wheel secured to the take-up spool supporting member, gearing, including a drive pinion and an interrupted gear meshing therewith, connecting said take-up spool support to the index plate, said interrupted gear being secured to the index plate with its untoothed portion in registry with the unnotched portion of the index plate but the untoothed portion of the interrupted gear being of less angular extent than the unnotched portion of the index plate, a double-armed lever pivotally mounted on the carriage and having a detent formed on one arm to engage the notches of the ratchet wheel and a detent formed on its other arm to engage in the notches of the index plate, said lever being manually rockable to disengage said detents, an arm secured to said lever whose free end is adapted to engage in the notches of the index plate upon disengagement of the last-named detent therefrom to hold the lever out of engaging position until the last-named detent enters another notch of the index plate, a manually rotatable indicator dial connected to the interrupted gear and index plate for rotating the index plate and interrupted gear back to starting positions, a cam connected to the index plate to rotate therewith, said cam member having two notches therein, a lever pivotally mounted on the carriage and having spaced portions adapted to engage respectively, simultaneously with said two notches, and a spring for urging said lever in one direction about its pivot to cause one of said portions to urge the cam, and with it the interrupted gear, to starting positions, when said portion is in engagement with one notch of the cam, the other portion of the last-named lever being adapted, when in engagement with the other notch of the cam, to prevent reverse rotation of the cam and interrupted gear.

CLARENCE ELWOOD SMITH.

REFERENCES CITED

The following references are of record in the file of this patent:

UNITED STATES PATENTS

| Number | Name | Date |
|---|---|---|
| 949,450 | Scotchmer | Feb. 15, 1910 |
| 1,036,385 | Vale | Aug. 20, 1912 |
| 2,063,331 | Nagel | Dec. 8, 1936 |
| 2,150,696 | Nelson | Mar. 14, 1939 |
| 2,161,941 | Zapp | June 13, 1939 |
| 2,233,345 | Hineline | Feb. 2, 1941 |
| 2,245,606 | Rauch | June 17, 1941 |
| 2,340,624 | Simmon | Feb. 1, 1944 |
| 2,347,732 | Briechle et al. | May 2, 1944 |
| 2,356,284 | Stockdale | Aug. 22, 1944 |
| 2,511,215 | Mihalyi | June 30, 1950 |

FOREIGN PATENTS

| Number | Country | Date |
|---|---|---|
| 580,047 | Germany | July 5, 1933 |
| 727,352 | Germany | Nov. 18, 1942 |